(No Model.)
G. E. GILLAM.
AUTOMATIC BRAKE FOR CARS.
No. 436,057. Patented Sept. 9, 1890.
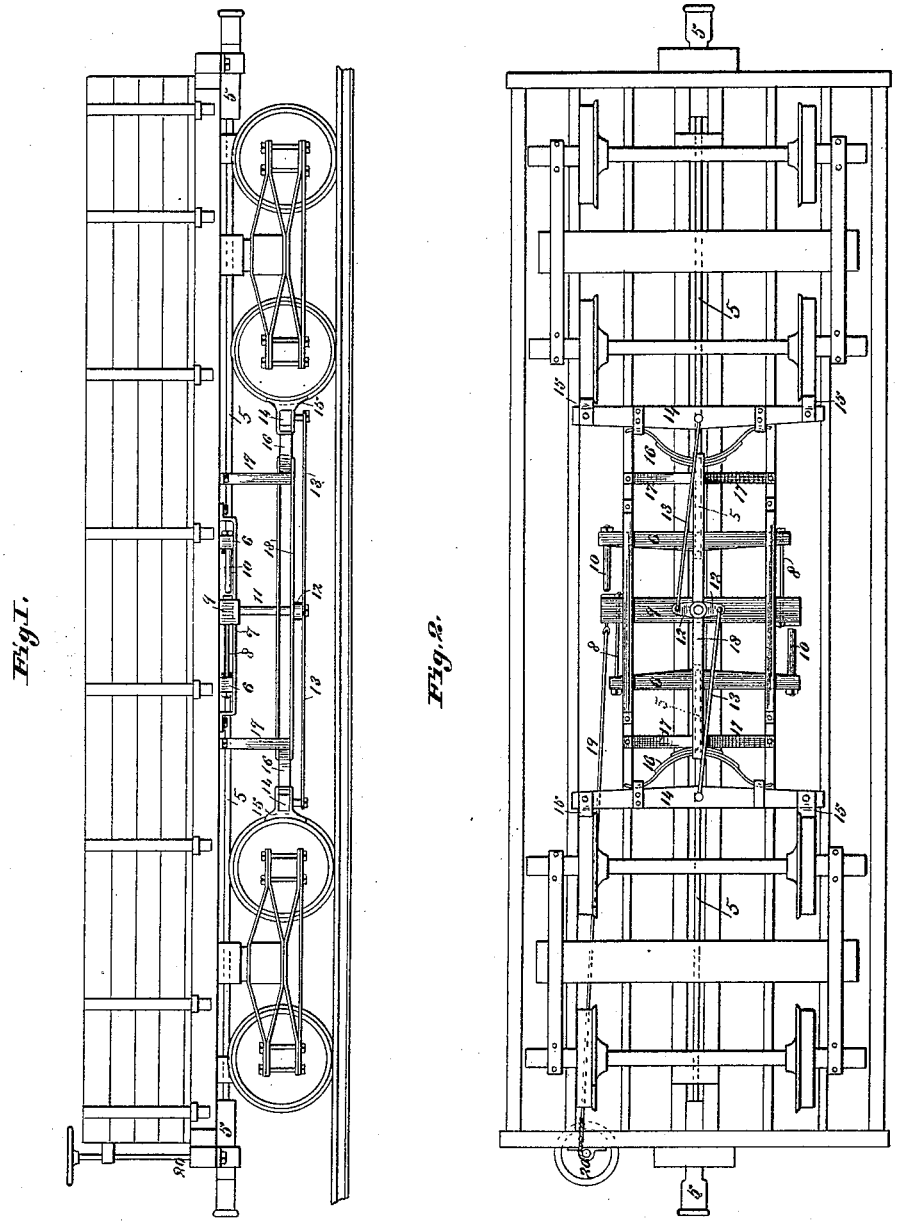
Witnesses:
Charles Pickles.
H. W. Korhammer.
Inventor:
George E. Gillam,
By Fowler & Fowler
Attorneys

UNITED STATES PATENT OFFICE.

GEORGE E. GILLAM, OF MACOMB, ILLINOIS, ASSIGNOR OF ONE-HALF TO WILLIAM PRENTISS, OF SAME PLACE.

AUTOMATIC BRAKE FOR CARS.

SPECIFICATION forming part of Letters Patent No. 436,057, dated September 9, 1890.

Application filed February 4, 1890. Serial No. 339,172. (No model.)

*To all whom it may concern:*

Be it known that I, GEORGE E. GILLAM, a citizen of the United States, residing at Macomb, county of McDonough, and State of Illinois, have invented certain new and useful Improvements in Automatic Brakes for Railway-Cars, of which the following is such a full, clear, and exact description as will enable any one skilled in the art to which it appertains to make and use the same, reference being had to the accompanying drawings, forming part of this specification.

My invention relates to brakes more particularly for railway-cars, in which the brakes are normally put on by a power device or spring and are taken off by means of connections between said power device or spring and the brakes and draw-bars, which draw-bars are operated by drawing or backing the car. Thus the act of drawing or backing the car automatically puts on and takes off the brakes.

In the accompanying drawings I have illustrated one form of my invention.

In the said drawings, Figure 1 is a side elevation of a freight-car having an automatic brake applied thereto made in accordance with my invention, and Fig. 2 is a bottom plan view of the same.

The same figures of reference indicate the same parts in the two views.

The invention may be applied to any car, it being independent of the construction of the car. I will not therefore describe any part of the car shown in the accompanying drawings which is not material to the invention.

5 5 are the ordinary draw-bars of a car. These draw-bars I extend inwardly and attach rigidly to the extended ends thereof cross-bars 6 6, the ends of which cross-bars slide in guides 7 upon each side beneath the body of the car. One of the opposite ends of each of these cross-bars is connected by a rod or chain 8 to a lever 9, which is pivoted to the bottom of the car beneath the same at or near its middle, and is actuated by said rods or chains 8 as the draw-bars are drawn outwardly in the act of pulling the car or cars. The other end of each of the cross-bars 6 6 is provided with push-bars 10, which operate upon the lever 9 when the draw-bars are pushed inwardly in backing the cars. To the lever 9 is rigidly affixed a short shaft 11, that extends downward therefrom beneath the car and carries at the lower end arms 12 12, to which are pivoted rods 13 13. These rods are in turn pivoted to the brake-bars 14 14, which carry brakes 15 at each end.

The brakes are normally put on by means of stout springs 16, which operate upon the brake-bars. These springs may be supported in any suitable way, but preferably are sustained by pieces or straps of metal 17, that extend downwardly from the bottom of the car, and, if preferred, may be braced together by means of bars 18, which may also fasten in place and journal the lower end of the shaft 11.

When the car is at rest, the brakes will be put on by means of the springs 16. If now the car be pulled in either direction, one or the other, or both, of the draw-bars (depending upon whether the car is drawing another car or is at the end of a train) will be drawn outward slightly, and one or both of the cross-bars 6 will also be moved toward the end of the car, which will, by means of the rods or chains 8, slightly rotate the lever 9 and turn the shaft 11 and the arms 12 12 so as to actuate the rods 13 13 and take off the brakes. In backing the car, one or both of the draw-bars will be pushed inwardly and move one or both of the cross-bars 6 inwardly, and will thereby cause the push-bars 10 to operate upon the ends of the lever 9 and will rotate the said lever slightly and cause it, by means of the connections before referred to, to take off the brakes. It will be noted that the arms 12 12 and the lever 9 are held normally at right angles to the longitudinal axis of the car by the springs 16 16, and that when said lever is rotated slightly in one or the other direction it compresses the springs and takes off the brakes. To the lever 9 may also be connected a rod or chain 19, which is operated upon by a hand-wheel 20 or other device arranged upon the car so as to take off the brakes manually instead of automatically. If the car should become detached from the train in any way, or if an accident should happen, the brakes will automatically be applied to the car or cars without the engineer, brakeman, or any other person having to put down brakes.

My invention is not necessarily limited to the use of a spring for putting on the brakes; but any other power device may be substituted therefor, such as compressed air or other fluid. So, too, the power device or springs for putting on the brakes can be automatically controlled by other means than the draw-bars.

What I desire to claim and secure by Letters Patent of the United States as my invention is—

The combination, to form an automatic brake for railway-cars and the like, of springs for normally putting on the brakes, rods controlling said springs, arms to which said rods are pivoted, a shaft journaled beneath the car carrying said arms, a lever rigidly affixed to said shaft, and cross-bars arranged upon an extension of the draw-bars, the opposite end of each of which is connected to said lever and the other opposite end of each provided with push-bars, for the purpose described.

In testimony whereof I have hereunto set my hand and affixed my seal, this 18th day of January, 1890, in the presence of the two subscribing witnesses.

GEORGE E. GILLAM. [L. S.]

Witnesses:
HIRAM H. HARRIS,
J. ROSS MICKEY.